July 23, 1963

J. E. WOLBER 3,098,991

CORROSION PROBE WITH CATHODICALLY PROTECTED
COMPENSATING ELEMENT

Filed Nov. 30, 1960

INVENTOR.
JAMES E. WOLBER

BY Edward H Sang

ATTORNEY

United States Patent Office 3,098,991
Patented July 23, 1963

3,098,991
CORROSION PROBE WITH CATHODICALLY PROTECTED COMPENSATING ELEMENT
James E. Wolber, Roselle, Ill., assignor to The Pure Oil Company, Chicago, Ill., a corporation of Ohio
Filed Nov. 30, 1960, Ser. No. 72,736
5 Claims. (Cl. 338—13)

This invention relates to a corrosion-test method and probe for use in determining the extent of corrosion of materials of construction in terms of metal loss, and more particularly, to a new form of resistance-change test probe designed for use in environments subject to rapid variations in temperature.

In solving or observing plant corrosion problems, corrosion tests carried out in the operating equipment provide the most reliable and consistent results. By observing the influence of corrosion under actual service conditions, the heterogeneousness of the corrosive environment is taken into consideration. The prior art teaches the use of various test probes and associated apparatus for measuring corrosion rates under service conditions. A corrodible test specimen, preferably fabricated from the same material as the equipment under study, is exposed to the corrosive atmosphere, and the extent of corrosion of the test specimen is determined from time to time. From the rate of corrosion of the test specimen, the rate of corrosion of the operating equipment under study can be estimated.

Methods have been devised which make use of the correlation between change in electrical conductivity and change in cross-sectional area of a test element to determine the rate of corrosion of materials of construction in a corrosive atmosphere through the use of corrosion-test probes connected to electronic resistance-change meters. These instruments employ resistance bridges to indicate quantitatively those changes in physical characteristics which cannot conveniently be measured by other methods. In such apparatus, one coupon or test specimen is supported by the probe means in exposure to the corrosive environment, whereas a second compensating coupon or test element is protected from the corrosive effects of the environment by means of a suitable corrosion-impervious coating, or by placing the compensating element within the body of the probe. The change in resistance of the exposed, corroding element is determined by connecting the elements of the probe so as to comprise one-half of a typical resistance bridge. Suitable electronic connections ahe made with the second half of the bridge which is placed outside the corrosive environment along with the power supply to the bridge and an appropriate electrical meter, such as galvanometer, which functions as a null detector. Loss of metal on the unprotected specimen induces small increases of resistance in the specimen so that the ratio of resistances of the corroding specimen and protected specimen change, and this change is measured by a suitable metering system and expressed directly in terms of corrosion rate.

Such corrosion-measurement devices provide, in theory, automatic temperature compensation so that erroneous readings are not obtained when the temperature of the corroding element increases or decreases during the test period. The corroding element and the compensating element, it is hoped, are always at the same temperature, and hence are affected similarly by changes in temperature in the corrosive environment, so that if the test element and compensating element have similar temperature-resistance characteristics, the resistance of each element will change proportionately when both undergo the same temperature change. Thus the ratio of the resistances of the elements is not affected by temperature change. Where the changes of temperature occurring during the test period are not rapid, the test element and compensating element are always at about the same temperature, and excellent temperature compensation is, in fact, automatically obtained. But where the temperature changes occurring during the test period are sudden or rapid, the compensating element which is coated with a corrosion-impervious material, or worse, protected within the body of the probe, is thermally insulated to a certain extent from the corrosive environment, so that the change of temperature of the compensating element lags behind the change in temperature of the corroding element. Because of the extreme sensitiveness of the resistance measurements made, it has been found that temperature differences of as little as 0.1° F. between the corroding element and the compensating element may introduce significant errors.

Corrosion probes have been devised in which both the corroding element and the compensating element are exposed to the corrosive environment, the compensating element being protected from corrosion by applying thereto a cathodically protecting current. These probes, however, are needlessly complicated in that separate wires must run from the cathodically protecting electrode and from each end of the compensating and corroding elements, necessitating a total of five leads.

It is an object of this invention to provide a corrosion test probe which employs two bare, uncoated elements in exposure to the test environment, so that the temperature response of both elements is identical. Another object of this invention is to provide a test probe for use in corrosion studies which is not subject to temperature-induced errors, and which is simple and inexpensive to manufacture. Another object of this invention is to provide a test probe in which a cathodically protecting anode serves as a support member for the projecting ends of the test specimen and compensating specimen.

Briefly, the apparatus of this invention comprises a base, a cathodically protecting anode projecting from the base, and bare test element and a bare compensating element supported to extend between the base and the projecting end of the anode.

This invention is best described with reference to the drawings, of which:

Figure 1:
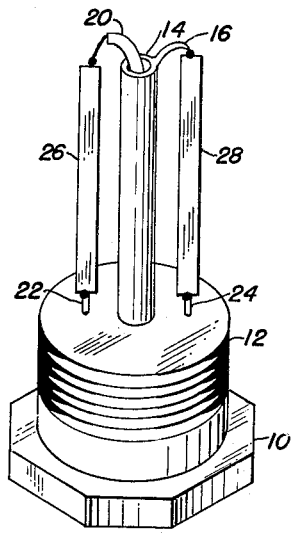
FIGURE 1 is a perspective view of a test probe fabricated in accordance with this invention.
Figure 2:
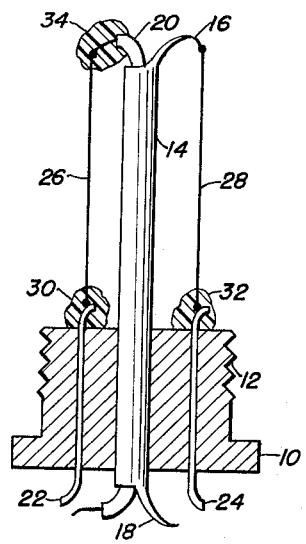
FIGURE 2 is a frontal view, partially in section, of the test probe depicted in FIGURE 1.

Referring to FIGURES 1 and 2, base 10 is threaded at 12 for insertion in a standard pressure vessel fitting. Base 10 is preferably fabricated of a corrosion resistant, electrically insulating plastic. Tubular anode 14 passes axially through base 10 and projects therefrom. Anode 14 is provided with flexible terminal portions 16 and 18, at the ends thereof. These terminal portions are adapted for connection to a compensating element, at 16, and to an electrical conductor, at 18. Through tubular electrode 14 passes insulated electrical conductor 20, which conductor derives mechanical support from the tubular anode within which it is disposed in fluid-tight relationship. Electrical conductors 22 and 24 pass through base 10 in fluid-tight relationship therewith. Test element 26 and compensating element 28 are supported at their respective ends, test element 26 extending between conductor 20 and conductor 22, and compensating element 28 extending between terminal portion 16 of anode 14 and conductor 24. The connections between the ends of the test element and compensating element and the conductors are sealed by an electrically nonconducting, corrosion-impervious sealant, such as epoxy resin. Alternatively, the junctions between the test element 26 and compensating element 28 and conductors 22 and 24, respectively, may be located within base 10, instead of exteriorly of the base.

The function of the sealant material is to eliminate galvanic cell effects between the conductors and the elements. By the expedient of extending anode 14 axially through base 10, adequate mechanical support is provided, and the necessity for providing a fourth lead wire connecting to the projecting end of compensating element 28 is eliminated. The compensating element is preferably disposed in parallel relationship with the anode 14, since this anode will serve as a sacrificial anode to cathodically protect the compensating element 28. By placing the anode and compensating element in parallel relationship, a uniform current density on the compensating element is obtained. It is evident that the tubular anode 14 serves in three capacities, as support means for the projecting ends of the test and compensating elements, as a cathodically protecting sacrificial anode, and as a conductor connecting with the projecting end of the compensating element.

The anode 14 may be made of any metal sufficiently anodic with respect to the compensating element to provide cathodic protection therefore. The entire anode need not necessarily be fabricated of an anodic metal, it being sufficient if the exterior surface of the anode is of an anodic metal. The selection of the metal from which the anode is to be fabricated will depend upon the nature of the metal of which the compensating element is comprised. For example, when the compensating element is made of steel, a metal anodic to steel such as aluminum, magnesium, or zinc may be used to fabricate the anode. Small diameter tube stock from which the anode may be readily made is commercially available.

It is preferred that the conductors 22 and 24 be fabricated of the same metal, to avoid thermo-electric effects which might otherwise be introduced. It is further desirable that conductor 20 be fabricated of the same material as the anode 26, again to eliminate thermo-electric effects, and also to eliminate errors which might otherwise be introduced by a difference in the temperature-resistance characteristics of the anode 14 and conductor 20. Errors induced by a difference in temperature-resistance characteristics of the anode and conductor 20 can be alternatively minimized by making the conductor and anode of large cross-sectional area. The test element and compensating element will, of course, have similar temperature-resistance characteristics, and preferably will be of ribbon-like configuration and fabricated of the same material of construction which is to be tested.

In use, the test probe is exposed to a corrosive, conductive environment. Anode 14 provides cathodic protection to compensating element 28, to which it is electrically connected. Test element 26 is not electrically connected to anode 14, and therefore is not cathodically protected thereby, but is free to corrode. After a suitable period of exposure, the test probe is connected to a conventional corrosion measuring meter, and the extent of resistance change is determined. During the test measurement period, electrical conductor 20 will be connected to the terminal portion 18 of the anode 14, and a single conductor will extend from this connection to the test measuring instrument. Hence, during the short interval of actual measurement, the test element 26 will also be cathodically protected by anode 14. Since the actual interval of measurement is small, this will not have a substantial effect on the outcome of the tests.

Various measuring circuits may be used with the apparatus and method of this invention, and are exemplified by the resistance-change meter described in U.S. Patent 2,830,265. The test element and compensating element may be fabricated as disclosed in that patent. Advantages are obtained by constructing the corrosion-test element and compensating element to have the same resistance. However, suitable unsymmetrical corrosion-test elements can be fashioned in accordance with this invention in which the resistances of these elements are not identical, provided, for the sake of consistency, a material of construction is employed which is substantially uniform in composition and resistivity. As a practical matter, there are mechanical and electrical factors which have to be taken into consideration in the design of suitable corrosion test probe elements. Lead resistance, for example, will be appreciable if a small corrosion-test probe is used in which the resistance of one element is only about one tenth or less the resistance of the other element. This factor is not pronounced in the case of large, unsymmetrical, test elements in which the resistance of even the smaller one is large compared to the lead resistance. The test element and compensating element are preferably ribbon-like and have a ratio of length-to-cross-section in excess of 100 to 1. Lead resistance can be substantially eliminated by the manner of interconnection of the corrosion-test unit with the measuring circuit. Mechanical considerations include making the test-probe unit large enough for easy assembly and attachment of lead wires.

From the description it is seen that the invention is necessarily confined to the use of test elements having the property of conducting electricity and showing a change in resistance proportional to changes in cross-sectional area due to corrosion. The materials of construction that meet these requirements include all metals and metal alloys, such as steel, iron, bronze, brass, copper, and the like. The environments to be investigated by the test elements or completed probes of this invention may be in any physical state or may exist as a mixture of substances in different physical states. The corrosive environment may be gaseous, vaporous, solid, or semi-solid, or mixtures of these forms of matter, but must be electrolytically conductive.

The embodiments of the invention in which an exclusive property or privilege is claimed are defined as follows:

1. A corrosion test probe comprising a base, an anode supported by said base and projecting therefrom, an elongated test element fabricated of a corrodible, conductive metal operably supported at one end by said base and at the other end by said anode, said test element and anode being in electrically insulated relationship, an elongated, metallic compensating element having a temperature-resistance characteristic similar to that of said test element operatively supported at one end by said base and at the other end by said anode, said anode and compensating element being electrically connected, the exterior surface of said anode being of a metal anodic with respect to said compensating element to cathodically protect the same, and electrical conductors connected to the ends of said test element and to the base-supported end of said compensating element.

2. An apparatus in accordance with claim 1 in which said anode is a hollow tube and the conductor connected to the anode-supported end of said test element passes through said hollow tube in electrically insulated relation therewith.

3. An apparatus in accordance with claim 2 in which said elements are supported substantially parallel to and spaced from said anode.

4. An apparatus in accordance with claim 3 in which said anode passes through said base from a face thereof from which said anode projects to a face opposite thereto.

5. An apparatus in accordance with claim 4 in which said anode and the conductor connected to said anode-supported end of said test element are fabricated of the same metal.

References Cited in the file of this patent
UNITED STATES PATENTS

| | | |
|---|---|---|
| 2,459,123 | Bates | Jan. 11, 1949 |
| 2,839,722 | Marsh | June 17, 1958 |
| 2,864,252 | Schaschl | Dec. 16, 1958 |